March 6, 1945.　　T. E. WARNER　　2,370,926
TOW BAR
Filed March 16, 1942

INVENTOR
THOMAS EDWARD WARNER

BY
ATTORNEYS

Patented Mar. 6, 1945

2,370,926

UNITED STATES PATENT OFFICE 2,370,926

TOW BAR

Thomas Edward Warner, Revelstoke, British Columbia, Canada

Application March 16, 1942, Serial No. 434,970
In Canada January 12, 1942

8 Claims. (Cl. 280—33.14)

This invention relates to an improved towing device.

An object of the present invention is the provision of a device for connecting one vehicle to another for towing purposes.

Another object is the provision of a towing device for rigidly connecting two vehicles together.

Another object is the provision of a towing device which, after being connected to the two vehicles, automatically assumes its proper position rigidly to connect the vehicles together.

A further object is the provision of a towing device which may easily be operated by one man.

A still further object is the provision of a device of the nature described of very simple and durable construction.

With these and other objects in view, the present invention consists essentially of a towing device for connecting two vehicles together, comprising a pair of tubes, one tube slidably fitting inside and projecting outwardly from the other, a relatively large buffer on the outer end of each tube, means for securing the outer ends of the tubes to the adjacent ends of the vehicles with their buffers bearing against said vehicles, and means for retaining the tubes in any adjusted position in relation to each other, as more fully described in the following specification and illustrated in the accompanying drawing, in which:

Figure 1:
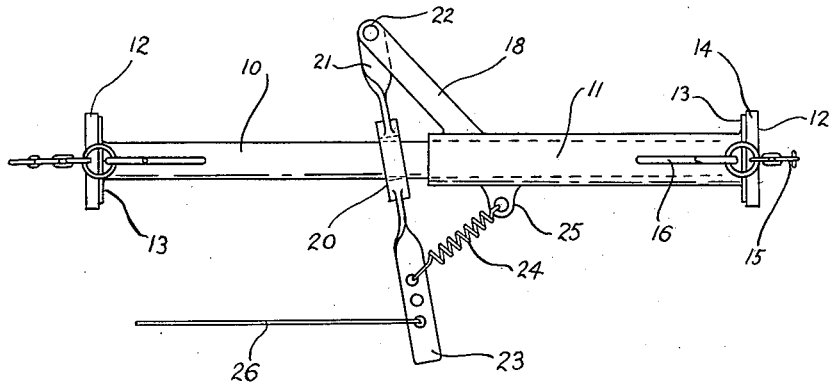
Figure 1 is a side elevation of the towing device.
Figure 2:
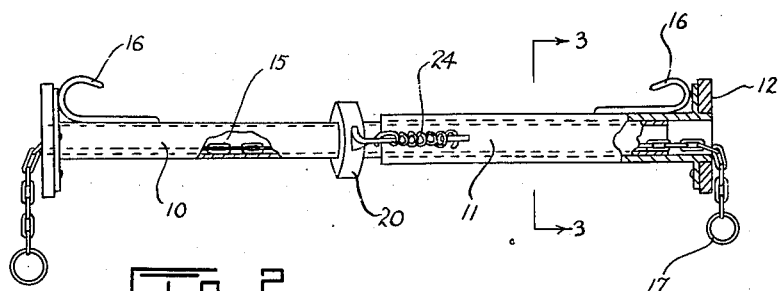
Figure 2 is a side elevation, partly in section, taken at right angles to Figure 1.
Figure 3:
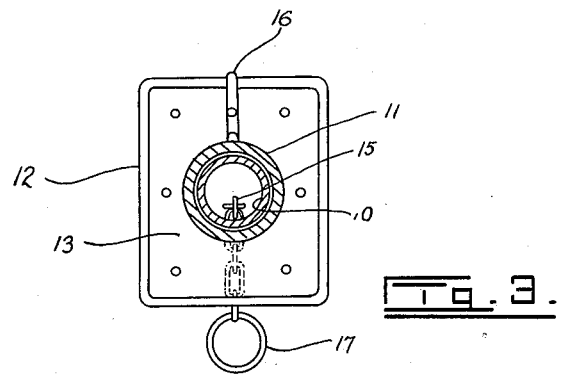
Figure 3 is a cross section taken on the line 3—3 of Figure 2.

Referring more particularly to the drawing, 10 is a tube which slidably fits into and projects outwardly from a tube 11. Each tube has a relatively large buffer 12 at its outer end. This buffer may consist of a flange 13 at the end of each tube covered with a facing 14 of rubber, leather, felt or the like.

Suitable means is provided for connecting the tubes 10 and 11 to the towing and towed vehicles. This preferably consists of a chain 15 extending through the tubes and beyond the outer ends thereof. This chain is considerably longer than the combined lengths of the tubes when they are drawn outwardly in relation to each other as far as possible while still retaining their telescopic connection. Each end of the chain is adapted to be passed around an appropriate part of one of the vehicles, such as an axle or bumper. Suitable means is provided at the outer end of each tube for securing the adjacent end of the chain after it has been passed around the part of the vehicle. In the illustrated example, a hook 16 is mounted at the outer end of each tube so that a link of the chain or a loop 17, provided for the purpose, may be connected or secured thereto.

Suitable means is provided for retaining the tubes 10 and 11 in any adjusted position in relation to each other. This preferably consists of means for removably gripping one of the tubes, such as the inner tube 10, as shown. To this end, an arm 18 projects outwardly from the outer tube 11 adjacent the inner end thereof, and a ring 20 is pivotally mounted on said arm. This may be accomplished by an extension 21 projecting outwardly from the ring which is pivotally connected to the arm 18, at 22. The ring 20 surrounds the tube 10 and resilient means is provided for normally holding the ring out of line with the axis of said tube. A handle 23 preferably extends outwardly from the ring opposite the extension 21 and a spring 24 is connected at one end to said handle, and at its opposite end to a lug 25 mounted on the tube 11. If desired, a relatively long cable 26 may be connected to the handle 23.

It is possible that the gripping means may be reversed in relation to the tubes 10 and 11, that is, the ring may be mounted on the inner tube 10 and surrounding the outer tube 11. In this case, the arm 18 and the lug 25 would have to be positioned near the outer end of the inner tube and said arm would have to be lengthened to reach close to the outer tube when the tubes are extended.

When the ring 20 is retained at an angle to the axis of the tube passing therethrough, it grips the tube so that it binds and prevents the tubes from being moved inwardly but it will permit the tubes to be moved outwardly. This latter is the case since any binding tends to move the ring towards a position at right angles to the shaft axis against the tension of the spring 24, thus releasing the tube.

When it is desired to tow a vehicle, the operator moves the rear end of the towing vehicle close to the front of the other vehicle. Then he moves the tubes 10 and 11 inwardly as far as possible. In order to do this, he moves the ring 20 into its releasing position by means of the handle 23. Then the ends of the chain 15 are passed around appropriate parts, say, for example, the bumpers of the vehicles and secured to the hooks 16. When the towing vehicle moves away, the slack is first taken up on the chain and then the tubes are pulled outwardly by the chain as far as the latter will allow. This movement of the tubes is not interfered with by the ring 20. This draws the buffers 12 against the bumpers, thus completing a rigid connection between the vehicles. The towed vehicle cannot move up on the towing vehicle since the ring 20 prevents the tubes from moving inwardly and the relatively large buffers bearing against the bumpers prevents any side sway or tendency the following vehicle may have to move out of line. The device is held tightly in place because the chain is hooked to the ends of the tubes and it has been drawn out as far as possible as the second vehicle is actually drawn along by the chain and, of course, the ring 20 will not permit the tubes to collapse. In this way, the device automatically assumes its proper position rigidly to connect the vehicles together.

In order to release the vehicles, the ring 20 is moved to its releasing position by means of the handle 23 and the towing vehicle is reversed until sufficient slack is provided to enable the ends of the chain to be removed from the hooks 16. The ring may be released by another person or, if the cable 26 is employed, it reaches to the driver of the towing vehicle who may pull it to move the ring to release position while he backs up.

From the above, it will readily be seen that a device rigidly connecting two vehicles together has been provided which automatically assumes its proper position and which may easily be operated by one man.

Various modifications may be made in this invention without departing from the spirit thereof or the scope of the claims, and therefore the exact forms shown are to be taken as illustrative only and not in a limiting sense and it is desired that only such limitations shall be placed thereon as are set forth in the accompanying claims.

What I claim as my invention is:

1. A towing device for connecting two vehicles together, comprising a pair of tubes, one tube slidably fitting into and projecting outwardly from the other, means for securing the outer ends of the tubes to the adjacent ends of the vehicles, means removably gripping the inner tube, said gripping means being adapted automatically to permit the tubes to be drawn outwardly in relation to each other and to prevent them from being moved inwardly, means for limiting the outward movement of the tubes when they are connected to the vehicles, and means for releasing the gripping means to permit the tubes to be moved inwardly.

2. A towing device for connecting two vehicles together, comprising a pair of tubes, one tube slidably fitting inside and projecting outwardly from the other, a relatively large buffer on the outer end of each tube, a chain extending through the tubes adapted to be passed around a portion of each vehicle at the ends of the tubes, means at the end of each tube for securing the adjacent end of the chain, a ring pivotally supported on one tube and surrounding the other, and means normally holding the ring out of line with the axis of the tube therein to grip said tube to prevent the tubes from being moved inwardly in relation to each other, said ring being movable into line with the axis to release the tube.

3. A towing device for connecting two vehicles together, comprising a pair of tubes, one tube slidably fitting inside and projecting outwardly from the other, a relatively large buffer on the outer end of each tube, a chain extending through the tubes adapted to be passed around a portion of each vehicle at the ends of the tubes, means at the end of each tube for securing the adjacent end of the chain, a ring pivotally supported on one tube and surrounding the other, resilient means normally holding the ring out of line with the axis of the tube therein to grip said tube to prevent the tubes from being moved inwardly in relation to each other, and a handle extending outwardly from the ring by means of which the latter may be moved into line with the axis to release the tube.

4. A towing device for connecting two vehicles together, comprising a pair of tubes, one tube slidably fitting inside and projecting outwardly from the other, a relatively large buffer on the outer end of each tube, a chain extending through the tubes adapted to be passed around a portion of each vehicle at the ends of the tubes, means at the end of each tube for securing the adjacent end of the chain, an arm extending outwardly from one tube, a ring pivotally mounted on the arm and surrounding the other tube, a spring connected to the tube carrying the ring and to the latter, said spring normally holding the ring out of line with the axis of the tube therein to grip said tube to prevent the tubes from being moved inwardly in relation to each other, and a handle extending outwardly from the ring away from its pivot by means of which the ring may be moved into line with the axis to release the tube.

5. A towing device for connecting two vehicles together, comprising a pair of tubes, one tube slidably fitting inside and projecting outwardly from the other, a relatively large buffer on the outer end of each tube, a chain extending through the tubes adapted to be passed around a portion of each vehicle at the ends of the tubes, a hook at the end of each tube for securing the adjacent end of the chain, a ring pivotally supported on one tube and surrounding the other, and means normally holding the ring out of line with the axis of the tube therein to grip said tube to prevent the tubes from being moved inwardly in relation to each other, said ring being movable into line with the axis to release the tube.

6. A towing device for connecting two vehicles together, comprising a pair of tubes, one tube slidably fitting inside and projecting outwardly from the other, a relatively large buffer on the outer end of each tube, a chain extending through the tubes adapted to be passed around a portion of each vehicle at the ends of the tubes, a hook at the end of each tube for securing the adjacent end of the chain, a ring pivotally supported on the outer tube and surrounding the inner tube, and means normally holding the ring out of line with the axis of the inner tube to grip said tube to prevent the tubes from being moved inwardly in relation to each other, said ring being movable into line with the axis to release the tube.

7. A towing device for connecting two vehicles together, comprising a pair of tubes, one tube slidably fitting inside and projecting outwardly from the other, a relatively large buffer on the outer end of each tube, a chain extending through the tubes adapted to be passed around a portion of each vehicle at the ends of the tubes, a hook at the end of each tube for securing the adjacent end of the chain, an arm extending outwardly from the outer tube, a ring pivotally mounted on the arm and surrounding the inner tube, a spring connected to the outer tube and to the ring, said spring normally holding the ring out of line with the axis of the inner tube to grip said tube to prevent the tubes from being moved inwardly in relation to each other, and a handle extending outwardly from the ring away from its pivot by means of which the ring may be moved into line with the axis to release the tube.

8. A towing device for connecting two vehicles together, comprising two tubular members, one fitting within and projecting outwardly from the other, a flexible retaining member extending through the tubes having a greater length than the combined length of the tubes, the said flexible member being formed at each end with means for engaging a fastening device, fastening devices for the flexible member mounted at the outer end of each tube, the end of the flexible member being adapted to be passed around appropriate parts on the two vehicles and to be then connected to the fastening devices, releasable retaining means supported on the outer tubular member having means to engage the inner tubular member adapted to permit it to move outwardly but to prevent it moving inwardly except when the device is in released position, and means operable at a distance from the retaining means for releasing the same.

THOMAS EDWARD WARNER.